Nov. 15, 1927.
N. K. HEARN
RADIUS ROD SUPPORT
Filed Dec. 17, 1926
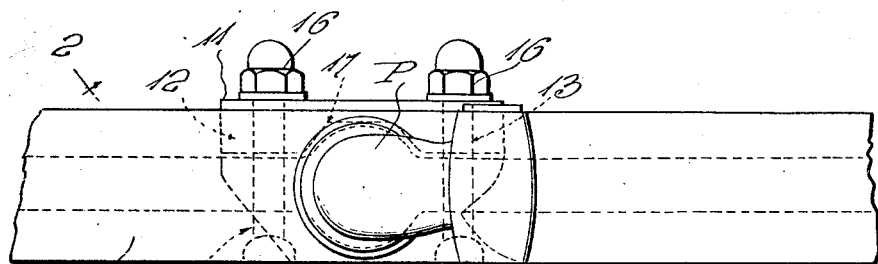
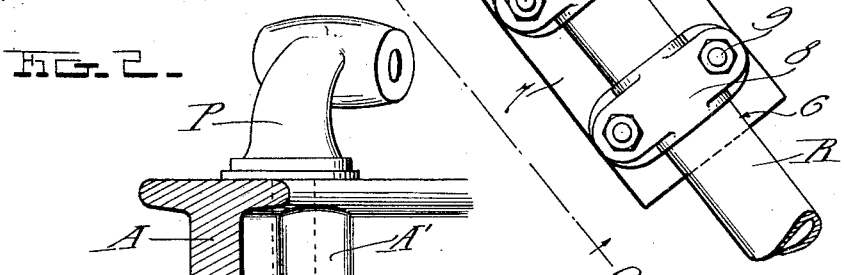
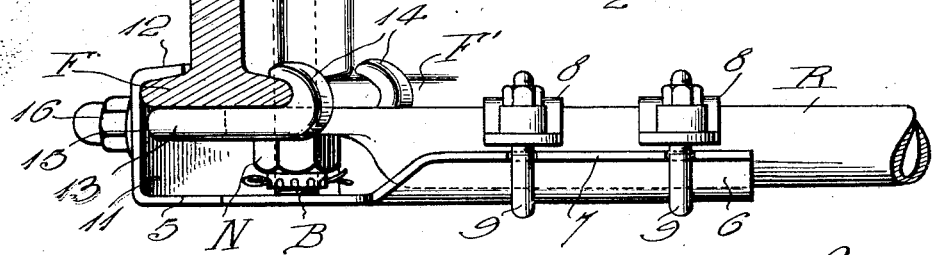
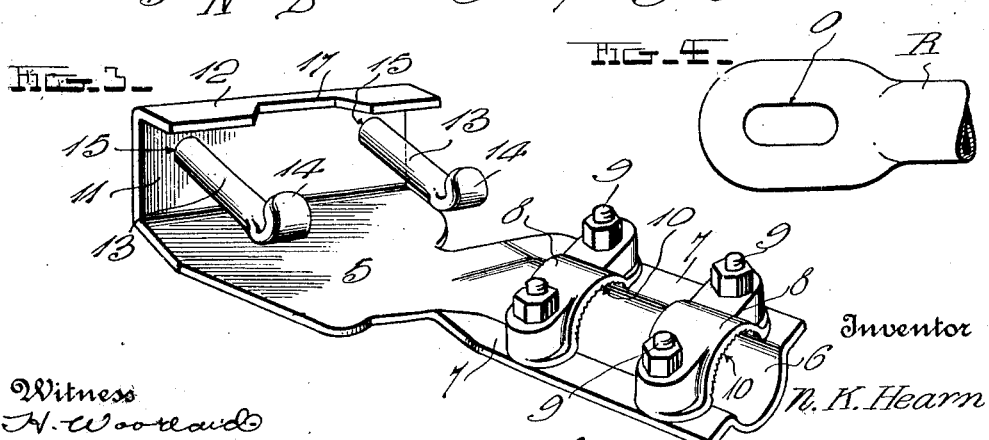
Inventor
N. K. Hearn
Witness
H. Woodard
By H. B. Willson & Co.
Attorneys Patented Nov. 15, 1927.

1,649,691

UNITED STATES PATENT OFFICE.

NORVAL K. HEARN, OF YATES CENTER, KANSAS.

RADIUS-ROD SUPPORT.

Application filed December 17, 1926. Serial No. 155,519.

The invention is intended for use upon a well known form of automobile having a V-shaped radius rod whose front ends are connected to the front axle by bolts and nuts which also secure the front spring perches to the axle. The front ends of the radius rod contact with the lower side of the axle and are held against the same by the nuts and bolts, and if either of these nuts becomes lost, one end of the radius rod is permitted to drop and is hence free of connection with the axle, often causing severe accidents. Moreover, a great deal of wear takes place causing the front ends of the radius rod to work loose and rattle, even if giving no serious trouble.

It is one object of my invention to provide a new and improved construction for securing the front ends of the radius rod to the front axle in such a rigid manner that strain is taken from the bolts and nuts and even should a bolt break or a nut become loosened therefrom, the rod and axle will still be held in rigid relation.

It is a further aim of the invention to provide a device by which the nuts on the above-named bolts, cannot work entirely from these bolts even if the cotter pins by which they are normally locked, are lost, and the nuts consequently loosened. Thus, there is no possibility of a spring perch jerking out of its proper position upon the axle and causing accident or other trouble.

A still further aim of the invention is to provide a device of the class set forth which, while being exceptionally simple and inexpensive, will be highly efficient and in every way desirable.

With the foregoing in view, the invention resides in the novel subject matter hereinafter described and claimed, the description being supplemented by the accompanying drawing.

Fig. 1 is a fragmentary top plan view, illustrating the invention applied.

Fig. 2 is a vertical section on line 2—2 of Fig. 1.

Fig. 3 is a perspective view showing the invention as manufactured and placed on sale.

Fig. 4 is a detail plan view of one end of the radius rod, showing the manner in which its bolt-receiving opening may be filed into elongated form to effect relative adjustment of rod and axle, should this be advisable.

In the drawing above briefly described, the preferred form of construction has been illustrated, and while this construction will be herein specifically defined, it is to be understood that within the scope of the invention as claimed, variations may be made.

The numeral 5 designates a horizontally elongated metal plate whose rear portion is formed with a longitudinal channel 6 to receive the lower portion of the radius rod R, said rear portion being provided also with flanges 7 which project laterally from the channel. Arched clamping members 8 are provided to extend over the rod R, and U-bolts 9 pass through openings in these members and the flanges 7 to secure the rear portion of the device securely to the radius rod, said bolts passing under the channel 6 to effect a tight clamping action without any tendency toward bending or breaking the plate. Preferably, the lower sides of the members 8 are roughened as at 10 to prevent possible slippage upon the rod.

The front portion of the plate 5 is intended to extend forwardly under the bolt B and nut N which are used to secure the rod R to the adjacent portion of the axle A, said bolt being connected with the spring perch P to also secure the latter to the axle. This front portion of the plate is directed first vertically as at 11 and then rearwardly as indicated at 12, for engagement with the front base flange F of the axle A. Bolts 13 are provided to extend under the axle A, the rear ends of said bolts having hooks 14 to engage the rear base flange F' of the axle A, while the front ends of these bolts pass through openings 15 in the vertical portion 11 of the plate 5, and are provided with nuts 16. When the hooks 14 are engaged with the axle and the nuts 16 tightened, the front portion of the device is securely clamped to the axle, and even if the nut N should work loose, the rod and axle will be firmly held in rigid relation. Moreover, by having the device extend under the nut N and the bolt B, said nut cannot accidentally work entirely off of the bolt and hence there is no danger of this bolt upwardly jerking from the axle A, for instance during recoil of springs, or if the bolt should become broken the lower end portion thereof will be prevented from dropping out and the bolt will still be held in position for connecting the rod with the axle thus relieving the support from the strain which would occur if the end of the rod was disconnected from the axle by the dropping out of the lower portion of the broken bolt.

When applying the device or at some other time, should it be advisable to adjust the axle with respect to the radius rod, the opening O in said rod, through which the bolt B passes may be filed to permit the necessary adjustment, as will be clear from the dotted lines in Fig. 2 and from Fig. 4. After this filing operation is performed the rod is again secured in place and the invention is applied, and such invention will serve to hold the axle and rod in relatively adjusted position, whether the nut N be tight or loose.

Ordinarily, the axle A is provided with a cylindrical enlargement A' through which the bolt B passes, and I prefer to form the portion 12 with a notch 17 to receive and engage this enlargement, holding the front end of the device against any possible sliding longitudinally of the axle.

In the preferred form of construction, the main body of the device (the portions 6, 7, 5, 11 and 12) are stamped or forged from a single metal plate of suitable thickness, thus permitting inexpensive production of the device and allowing it to be sold at small cost.

On account of the excellent results obtained from the details disclosed, these details are preferably followed. However, within the scope of the invention as claimed, variations may be made.

I claim:—

1. A radius rod support comprising a horizontally elongated plate to underlie the front portion of the rod and adjacent part of the front axle, the front end of said plate being directed upwardly and then rearwardly to hook over the front base flange of the axle, a bolt to underlie the axle, the rear end of said bolt having a hook to engage the rear base flange of the axle while the front end of said bolt passes through the upwardly directed plate portion and is provided with a nut, and means for securing the rear portion of the plate to the rod.

2. A radius rod support comprising a horizontally elongated plate to underlie the front portion of the rod and adjacent part of the front axle, the front end of said plate being directed upwardly and then rearwardly to hook over the front base flange of the axle, a bolt to underlie the axle, the rear end of said bolt having a hook to engage the rear base flange of the axle while the front end of said bolt passes through the upwardly directed plate portion and is provided with a nut, the rear portion of said plate being longitudinally channeled to receive the radius rod and having lateral flanges, an arched clamping member to extend over the rod and flanges, and fasteners passing through said clamping member and flanges.

In testimony whereof I have hereunto affixed my signature.

NORVAL K. HEARN.